(12) United States Patent
Mostafa

(10) Patent No.: US 7,631,037 B2
(45) Date of Patent: Dec. 8, 2009

(54) DATA TRANSMISSION

(75) Inventor: Miraj Mostafa, Tampere (FI)

(73) Assignee: Nokia Corporation, Espoo (FI)

( * ) Notice: Subject to any disclaimer, the term of this patent is extended or adjusted under 35 U.S.C. 154(b) by 978 days.

(21) Appl. No.: 10/712,370

(22) Filed: Nov. 14, 2003

(65) Prior Publication Data

US 2004/0148400 A1  Jul. 29, 2004

Related U.S. Application Data

(63) Continuation-in-part of application No. 10/149,639, filed as application No. PCT/IB02/01431 on Feb. 8, 2002.

(30) Foreign Application Priority Data

Feb. 8, 2001 (FI) ................................. 20010238
Nov. 14, 2002 (GB) ................................. 0226571.8

(51) Int. Cl.
*G06F 15/00* (2006.01)

(52) U.S. Cl. .................... 709/203; 709/223; 709/228; 715/513; 715/515

(58) Field of Classification Search .............. 709/220, 709/231, 235, 223, 228; 455/414.1; 715/500; 725/513, 515
See application file for complete search history.

(56) References Cited

U.S. PATENT DOCUMENTS 5,581,784 A * 12/1996 Tobagi et al. ................. 710/6
5,642,171 A * 6/1997 Baumgartner et al. ....... 348/515
5,745,782 A * 4/1998 Conway ...................... 715/202
5,857,099 A * 1/1999 Mitchell et al. ............. 704/235
5,860,064 A * 1/1999 Henton ....................... 704/260
6,976,082 B1 * 12/2005 Ostermann et al. .......... 709/231
7,024,475 B1 * 4/2006 Abaye et al. ................ 709/224

(Continued)

FOREIGN PATENT DOCUMENTS

JP  10-040188  2/1998

(Continued)

OTHER PUBLICATIONS

3GPP TS 23.140 V5.40 (Sep. 2002), Technical Specification, 3$^{rd}$ Generation Partnership Project; Technical Specification Group Terminals; Multimedia Messaging Service (MMS); Functional Description; Stage 2 (Release 5) See chapter 7.1.7, Annex J.

(Continued)

*Primary Examiner*—Khanh Q Dinh
(74) *Attorney, Agent, or Firm*—Foley & Lardner, LLP

(57) ABSTRACT

A multimedia messaging service (MMS), wherein a user agent is notified of availability of a multimedia message and subsequently, after the user agent has sent a retrieve request, a streamable media component of a multimedia message is streamed to the user agent in a streaming session. The streaming session is established according to Session Description Data (SDD). Responsive to the retrieve request, the multimedia message is delivered to the user agent so that the streamable media component is represented with a descriptor pointing to a location from which the SDD can be obtained. The SDD is generated before or after the user agent requests for retrieval of the multimedia message but not necessarily by the time the user agent is notified for the availability of the multimedia message.

34 Claims, 8 Drawing Sheets

U.S. PATENT DOCUMENTS

| | | | |
|---|---|---|---|
| 7,174,560 B1 * | 2/2007 | Crinon | 725/60 |
| 7,284,187 B1 * | 10/2007 | Corboy | 715/203 |
| 2007/0037557 A1 * | 2/2007 | Shao et al. | 455/414.1 |

FOREIGN PATENT DOCUMENTS

| | | |
|---|---|---|
| JP | 10-240-643 | 9/1998 |
| JP | 2001-005751 | 1/2001 |
| WO | 02/11398 | 2/2002 |
| WO | 02/43414 | 5/2002 |
| WO | 02/063849 | 8/2002 |

OTHER PUBLICATIONS

3GPP TS 26.233 V5.0.0 (Mar. 2002), Technical Specification, $3^{rd}$ Generation Partnership Project; Technical Group Services and System Aspects; Transparent end-to-end packet switched streaming service (PSS); General Description (Release 5) See chapter 4.2.

3GPP TS 26.234 V5.2.0 (Sep. 2002), Technical Specification, $3^{rd}$ Generation Partnership Project; Technical Specification Group Services and System Aspects; Transparent end-to-end packet switched streaming service (PSS); Protocols and codecs (Release 5) See chapter 9, Annex A.

* cited by examiner

DATA TRANSMISSION

CROSS REFERENCES TO RELATED APPLICATIONS

This application is a continuation-in-part of U.S. application Ser. No. 10/149,639, filed Feb. 3, 2003, which claims priority from Finnish Patent Application No. 20010238, filed Feb. 8, 2001, which is a U.S.C. 371 application of PCT/IB02/01431, filed Feb. 8, 2002. The entire disclosure of this application is incorporated herein by reference.

BACKGROUND OF THE INVENTION

1. Field of the Invention

This invention relates to data transmission. More specifically, the invention relates to the streaming of media content in a Multimedia Messaging Service.

2. Description of the Prior Art

In mobile communications networks, the term Multimedia Messaging Service (MMS) is commonly used to describe a new approach for transmitting messages having multimedia content. The Multimedia Messaging Service allows messaging between different mobile users and/or between mobile users and the Internet. There is an already agreed solution for providing an MMS in $3^{rd}$ Generation mobile communication networks and its features are described in $3^{rd}$ Generation Partnership Project (3GPP) Technical Specification (TS) 23.140, V.4.1.0 "Multimedia Messaging Service (MMS), Functional Description, Stage 2 (Release 4, 2000-12)". The Multimedia Messaging Service proposed in 3GPP TS 23.140, release 4 employs a store-and-forward approach to message delivery. Multimedia messages are constructed in such a way that the media content, information necessary to describe the media content and addressing information, identifying the intended receiver of the message, are encapsulated together. The multimedia message is then sent from a sending MMS user agent to a Multimedia Messaging Service Center MMSC, which in turn notifies the intended receiver (recipient MMS user agent) about the message. Later on, the multimedia message is downloaded by the recipient MMS user agent terminal as a whole and only presented to the user once downloaded and stored in the recipient MMS user agent.

Next, the structure and operation of a typical MMS system will be described with reference to FIGS. 1, 2 and 3.

FIG. 1 shows an overview of MMS system elements according to 3GPP TS 23.140. The system comprises the following items:

- a plurality of MMS user agents (UAs) 110, each of which is capable of transmitting and receiving multimedia messages;
- a roaming MMS user agent 127;
- Access networks 122, 124 and 126 of different types including:
  - A second generation mobile telecommunications network 122 such as a GSM phase 2 network;
  - A third generation mobile telecommunications network 124 such as a Universal Mobile Telecommunications System (UMTS); and
  - A mobile access network 126, for example a wireless-LAN network.
- The Internet (or another Internet Protocol (IP)-network) 130, having an external server 134, such as an e-mail server, and a wired E-mail client 132;
- A Multimedia Messaging Service relay 142 and an MMS server 144 which, in this example, are integrated into a single unit, referred to as a Multimedia Messaging Service Centre (MMSC) 140, but which can alternatively be implemented as separate or distributed entities;
- A message store 150 in connection with the MMS server 144; and
- User databases 160 comprising, for example, user subscription and addressing information.

The collective term Multimedia Messaging Service Environment (MMSE) is used to describe those functional elements that operate together to implement a multimedia messaging service. In FIG. 1, an MMSE is formed by the elements within the oval outlined region.

Referring in further detail to FIG. 1, each MMS user agent 110 connects to the MMS relay 142 through its access network 122, 124. The roaming MMS user agent 127 connects to the MMS relay 142 through the mobile access network 126 and via the Internet 130. The MMS relay is connected to the MMS server 144 and to the user databases 160. Furthermore, the external server 134 and the wired E-mail client 132 are connected to the Internet 130.

FIG. 2 shows an overview of interworking between different MMSE's according to 3GPP TS 23.140. The communication of multimedia messages takes place between user agents 110A (sender) and 110B (recipient) which reside in two different Multimedia Messaging Service Environments. For simplicity and clarity, the two Multimedia Messaging Service Environments, MMSE A and MMSE B, are each shown to comprise a single MMS relay, linked to a single MMS server, thus forming two MMSC's 214 and 224. It should be appreciated that in a practical MMSE, the number of MMS relays and servers may be, and typically will be, greater than this. MMSE A and MMSE B may, for example, have different operators, different geographical locations or coverage areas and/or differ in terms of their technical characteristics and capabilities. Furthermore, in the situation where a particular MMSE comprises more than one MMS relay, the method according to the invention can also be applied within the MMSE.

In the example shown in FIG. 2, both MMS user agents 110A and 110B are depicted as devices that communicate with their respective MMSE 210, 220 via a radio communication network 212, 222. However, it should be appreciated that either MMSE user agent A or MMSE user agent B, or both of them, could reside in a fixed line network (not shown).

In connection with FIG. 2, it is assumed that MMS user agent A 110A, which has subscribed to the multimedia messaging service provided in Multimedia Messaging Service Environment A 210, wishes to send some media content to MMS user agent B 110B, which has a subscription to the multimedia messaging service provided in MMSE B 220. In general, the content of a multimedia message can comprise a variety of components, some of which are suitable for streaming and other components which are not typically suitable for streaming, such as text or still images. In the following example, which describes the creation, transmission and retrieval of a multimedia message, it is assumed that all the components of the message are non-streamable content types. The current provisions for streaming download of multimedia message components provided by 3GPP TS 23.140 will then be considered separately.

Referring once more to FIG. 2, when initiating the communication of a multimedia message to MMS user agent B, MMS user agent A first selects the media content to be transmitted. For example, the media content may take the form of a still image and some associated text, stored in the memory of user agent A. The image may have been recorded, for example, using a camera, and still image encoding equipment built into user agent A. Alternatively, the image and text may already have been downloaded from another source to user agent A. In either case, user agent A encapsulates the media content as a multimedia message, comprising the media content itself, information necessary to describe the media content and addressing information, identifying the intended recipient of the message. MMS user agent A then sends the message to MMS relay A through radio network A 212.

On receiving the multimedia message, MMS relay A determines, from the addressing information included with the message, that the intended recipient is not a user agent of MMSE A, but a user agent of MMS relay B and forwards the multimedia message to MMS relay B. Routing of the multimedia message to the correct MMS relay, i.e. that responsible for MMS user agent B is achieved, for example, using standardised mechanisms provided for in the existing 3GPP multimedia messaging solution. On receiving the multimedia message, MMS relay B stores the media content in MMS server B and sends a notification to the intended recipient, MMS user agent B, thereby indicating that a multimedia message has arrived and its content is available to be downloaded from MMS relay B. In response to receiving the notification, MMS user Agent B retrieves the media content from (via) the MMS relay B. The retrieval of the media content is initiated by signalling with MMS relay B.

FIG. 3 illustrates the process of notification and multimedia message retrieval in more detail. Specifically, FIG. 3 shows the flow of messages that takes place when MMS relay B receives an MMS message intended for recipient MMS user agent B. MMS relay B receives the MMS message, stores it in MMS server B, and then informs MMS user agent B of the arrival of the message using an MMS notification message 310 (MM1_notifcation.REQ in 3GPP TS 23.140).

Next, the MMS user agent B responds with an MMS notification response 320 (MM1_notifcation.RES in 3GPP TS 23.140) to acknowledge receipt of the MMS notification 310.

Having received the MMS notification message 310, MMS user agent B is aware that a multimedia message is available for retrieval and may initiate a process to download the message. This may be done substantially as soon as the notification message is received, or may be performed at some later time. When MMS user agent B desires to start downloading the MMS message, the agent sends an MMS retrieve request 330 (MM1_retrieve.REQ) to MMSC B 224. MMSC B 224 responds by retrieving the multimedia message from MMS server B and sends an MMS retrieve response 340 (MM1_retrieve.RES in 3GPP TS 23.140) to MMS user agent B. In the case of a multimedia message that comprises only non-streamable media components, as considered in this example, the MMS retrieve response message carries the actual multimedia message components to be downloaded. After receipt of the entire multimedia message, the MMS user agent B sends an MMS acknowledgement 350 (acknowledging the receipt of the entire multimedia message) to the MMS relay B.

As mentioned earlier, some media components may be suitable for downloading by streaming. The term "streaming" is generally used to describe the presentation of media content, for example an audio or video clip, or a combination of different media types, in a continuous way while the content is being transmitted to a recipient over a data network. A "stream" can be a flow of data enabling the recipient to present some continuous flow of information such as motion pictures (i.e. video), voice or music. In a typical video stream, some 10 to 20 video frames are transmitted per second. In practice, streaming can be either live (real-time) or performed in an on-demand fashion. The term "live streaming" describes the creation of a media stream from a live source, for example a stream of digital images produced by a video camera, while the term "on-demand streaming" describes the creation of a media stream from, for example, a file stored on a server.

The application of streaming in mobile networks looks very promising, especially considering the fact that mobile terminals typically have limited multimedia playing resources such as memory and processing power. In general, the adoption of a streaming approach to media download and presentation has the potential to reduce the amount of available memory required by mobile terminals Recently, interest has also arisen in the incorporation of streaming into the proposed $3^{rd}$ generation multimedia messaging service. However, as mentioned earlier, the MMS service is based on the encapsulation of media content, message description and addressing information into a single message. This kind of encapsulation is incompatible with the streaming of media content and therefore certain modifications to the MMS service recommendations are necessary in order to accommodate the streaming download of media content. 3GPP TS 23.140, release 4 allows a streaming session to be established between a recipient user agent and a recipient MMS relay, but requires that the notification message sent from the recipient MMS relay to the recipient MMS user agent be modified to a certain extent.

According to the recommendation, if a recipient MMS relay, such as MMS relay B described in the above example, receives a multimedia message containing streamable media content, the relay forms a modified MMS notification message and sends it to the intended recipient user agent to notify it about the streamable media components. The modified notification message contains information necessary to initialise a streaming session between the recipient MMS user agent and an MMS server that has access to the streamable media components.

Thus, according to 3GPP TS 23.140, release 4, the standard MMS notification message, used to inform an intended recipient user agent that a multimedia message is available for download, must be modified in such a way as to provide particulars of a streamable media component to be downloaded. This enables the recipient user agent to establish a streaming session to download the media component.

However, despite this modification, there is still no mechanism available in the MMS specification to enable the downloading of both streamable and non-streamable media components in a consistent manner. There is a need for such a capability, because of the usefulness of receiving both non-streamable media components, such as still pictures and text or program applets together with streamable media components such as sound, voice or video streams.

SUMMARY OF THE INVENTION

According to a first aspect of the invention there is provided a method for receiving a multimedia message in a mobile multimedia messaging service, comprising the steps of:
  receiving a multimedia message transmission;
  separating from the multimedia message transmission a descriptor representing a stored streamable media component and containing information necessary to initiate a streaming session, the information necessary to initiate the streaming session comprising a pointer; and
  initiating a streaming session, using the descriptor, to retrieve the stored streamable media component described by the descriptor;
  the method further comprising obtaining session description data using the pointer and the initiating of the streaming session comprising the sub-step of using the session description data to initiate the streaming session.

The method may further comprise transmitting streaming adaptation information before receiving the session description data. Advantageously, the streaming adaptation information of the user agent allows generation of the SDD dependent on the properties of and/or preferences related to the terminal that actually retrieves a streamable media component of the multimedia message.

The streaming adaptation information may comprise information on the user agent's capabilities to stream data and/or user preferences relating to streaming.

The method may further comprise the step of separating a non-streamable media component from the multimedia message transmission.

The method may further comprise transmitting streaming adaptation information before receiving the session description data.

The method may further comprise receiving a notification message that the multimedia message is available.

The streaming adaptation information may be transmitted after receiving the notification message.

The descriptor may be selected from a group consisting of a session description file, a uniform resource locator (URL), and a Universal Resource Identifier (URI).

The method may further comprise separating a non-streamable media component from the multimedia message transmission.

Two different streamable media components of a multimedia message may be represented by two different descriptors contained in the multimedia message.

The multimedia message transmission may be received wirelessly.

According to a second aspect of the invention there is provided a method for multimedia messaging in a mobile multimedia messaging service, comprising the steps of:
  receiving a multimedia message containing a streamable media component;
  replacing the streamable media component with a descriptor providing information allowing a recipient user agent to initiate a streaming session to retrieve the streamable media component; and
  sending the multimedia message to the recipient user agent; wherein
  the information allowing the multimedia user agent to initiate a streaming session comprises a pointer using which session description data necessary to initiate a streaming session can be obtained.

The invention provides the advantage of allowing transmission of streamable media components using communication systems according the existing MMS specifications with only minor modifications.

The method may further comprise notifying a recipient user agent that a message is available using a notification message.

The invention allows the use of a single type of notification message to inform a recipient MMS user agent that a multimedia message is available for download. In other words, a single notification message type may be used regardless of the media content of a particular multimedia message. This has the advantage of simplifying the formation of notification messages and allowing the availability of multimedia messages for download to be indicated in a consistent manner.

The method may further comprise obtaining streaming adaptation information regarding the user agent and generating the session description data responsive to the streaming adaptation information. The streaming adaptation information may be obtained from the user agent after the notification message has been sent to the user agent. This avoids unnecessary processing in the situation where delivery of the multimedia message is never requested by the user agent. It further permits adapting the session description data to correspond with the capabilities of the user agent actually used to stream the streamable media component in a situation where the user changes the equipment used between receiving the notification and retrieving the multimedia message. The session description data may also be adapted taking into account the capabilities of the network from which the multimedia message is sent to the user agent.

In a situation where a multimedia message contains more than one streamable media component, each streamable media component is advantageously replaced with a corresponding descriptor. Alternatively, the descriptor contains information relating to at least two or all streamable media components. The descriptor is then provided in the multimedia message in place of all the streamable media components, which it describes.

This replacement may be performed either by a recipient MMS relay or MMS server. In other words, the replacement may be performed by the MMS relay or MMS server associated with the recipient user agent. Alternatively, another communication block such as a proxy server can perform the replacement.

The pointer may be selected from a group consisting of a Uniform Resource Locator (URL), and a Universal Resource Identifier (URI).

The session description data may contain a session description file.

The session description file may be a session description protocol (SDP) file.

The session description file may contain all the data necessary to initiate a streaming session to download a streamable media component.

According to a third aspect of the invention there is provided a multimedia messaging user agent comprising:
  a transceiver for receiving a multimedia message; and
  a processor for obtaining from the multimedia message a descriptor that represents a stored streamable media component and contains information necessary to initiate a streaming session, the information necessary to initiate the streaming session comprising a pointer;
  the processor being further configured to control the transceiver to obtain session description data by using the pointer and to control the transceiver to initiate the streaming session using the session description data.

According to a fourth aspect of the invention there is provided a multimedia messaging service system comprising:
  a first network element for receiving a multimedia message comprising a streamable media component;
  a plurality of user agents;
  a second network element for notifying a recipient user agent of a multimedia message available to the recipient user agent;
  a third network element for replacing the streamable media component with a descriptor allowing the recipient user agent to initiate a streaming session to retrieve the streamable media component; and
  the second network element for receiving a request for delivering the multimedia message to the recipient user agent and transferring the multimedia message to the recipient user agent responsive to the request, wherein
  the descriptor comprises a pointer using which the recipient user agent can obtain session description data necessary to initiate a streaming session for delivering the streamable media component.

The second and third network elements may belong to a common network entity, for example a multimedia relay. Alternatively, they may belong to different network entities.

According to a fifth aspect of the invention there is provided a multimedia messaging network entity for operating in a mobile multimedia messaging service, comprising:

an input for receiving a multimedia message containing a streamable media component;

a processor for replacing the streamable media component of the multimedia message with a descriptor providing information allowing a recipient user agent to initiate a streaming session to retrieve the streamable media component; and an output for sending the multimedia message to the recipient user agent;

wherein the information allowing the multimedia user agent to initiate a streaming session comprises a pointer using which session description data necessary to initiate a streaming session can be obtained.

According to a sixth aspect of the invention there is provided a computer program product for controlling a multimedia messaging user agent, comprising:

computer program code enabling the user agent to receive a multimedia message transmission;

computer program code enabling the user agent to separate from the multimedia message transmission a descriptor representing a stored streamable media component and containing information necessary to initiate a streaming session, the information necessary to initiate the streaming session comprising a pointer;

computer program code enabling the user agent to retrieve, using the descriptor, the stored streamable media component described by the descriptor; and computer program code enabling the user agent to obtain session description data using the pointer; wherein the computer program code enabling the user agent to initiate a streaming session being configured to use the session description data to initiate the streaming session.

According to a seventh aspect of the invention there is provided a computer program product for controlling a multimedia messaging network entity, comprising:

receiving a multimedia message containing a streamable media component;

computer program code enabling the network entity to replace the streamable media component with a descriptor providing information allowing a recipient user agent to initiate a streaming session to retrieve the streamable media component; and computer program code enabling the network entity to send the multimedia message to the recipient user agent; wherein the information allowing the multimedia user agent to initiate a streaming session comprises a pointer using which session description data necessary to initiate a streaming session can be obtained.

It should be appreciated that the embodiments of any one aspect may produce advantages when combined with other aspects of the invention and that they can be combined where applicable, even though not all embodiments are expressly written after all aspects.

BRIEF DESCRIPTION OF THE DRAWINGS

The invention will now be described, by way of example only, with reference to the accompanying drawings, in which.

DETAILED DESCRIPTION

Figure 1:
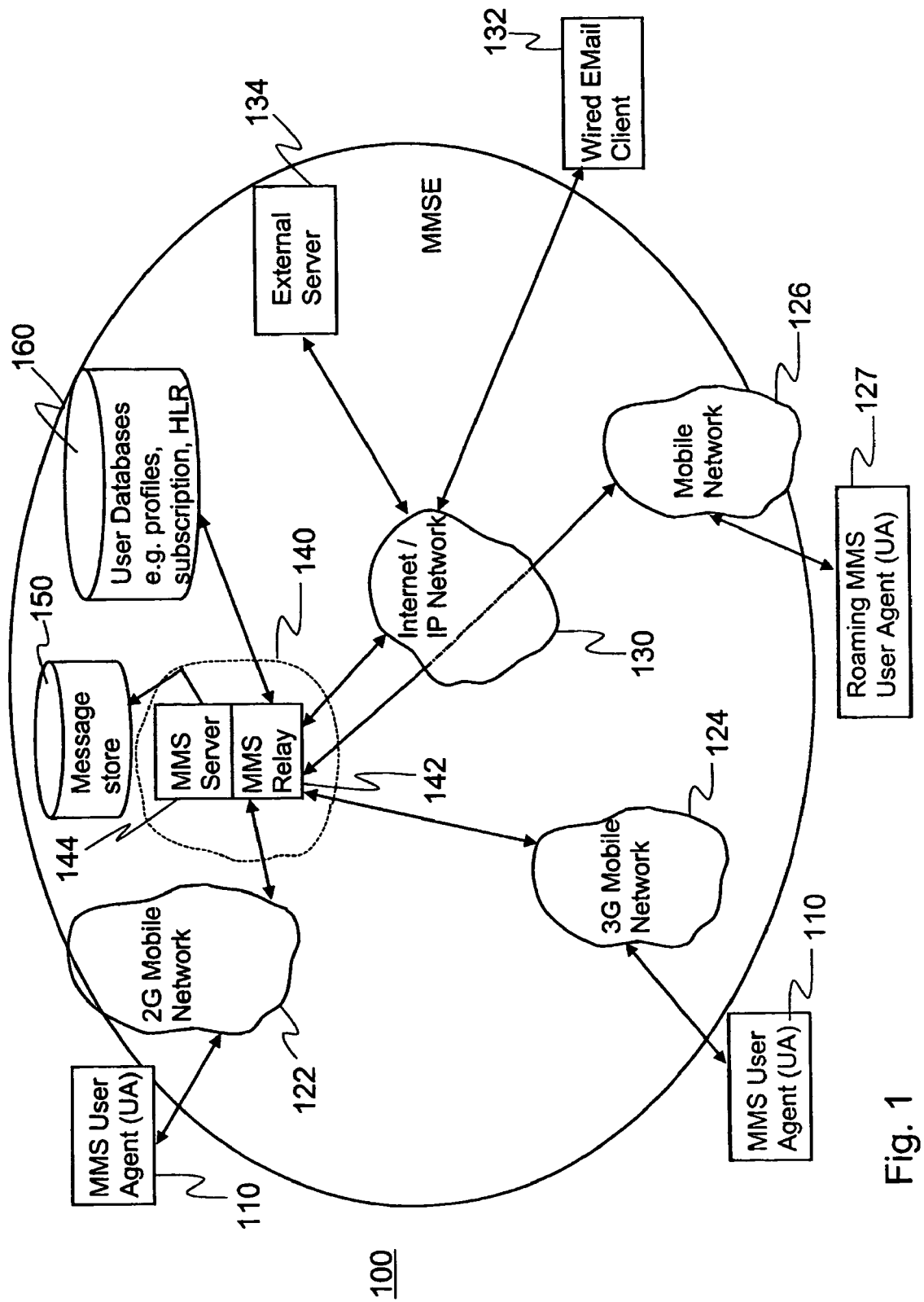
FIG. 1 shows an overview of MMS system elements according to 3GPP TS 23.140, v. 4.
Figure 2:
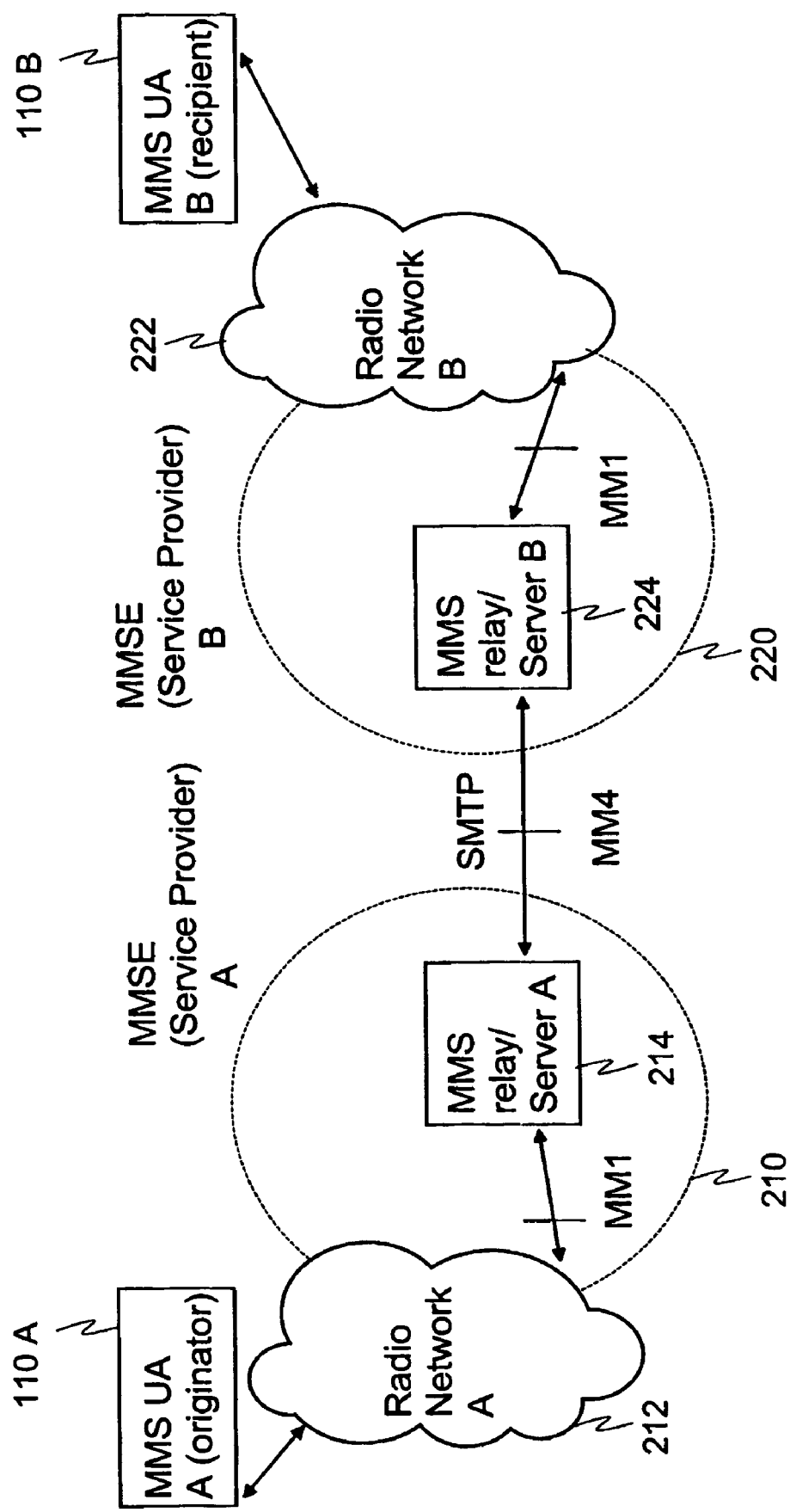
FIG. 2 shows an overview of interworking MMS system elements according to 3GPP TS 23.140, v. 4.
Figure 3:
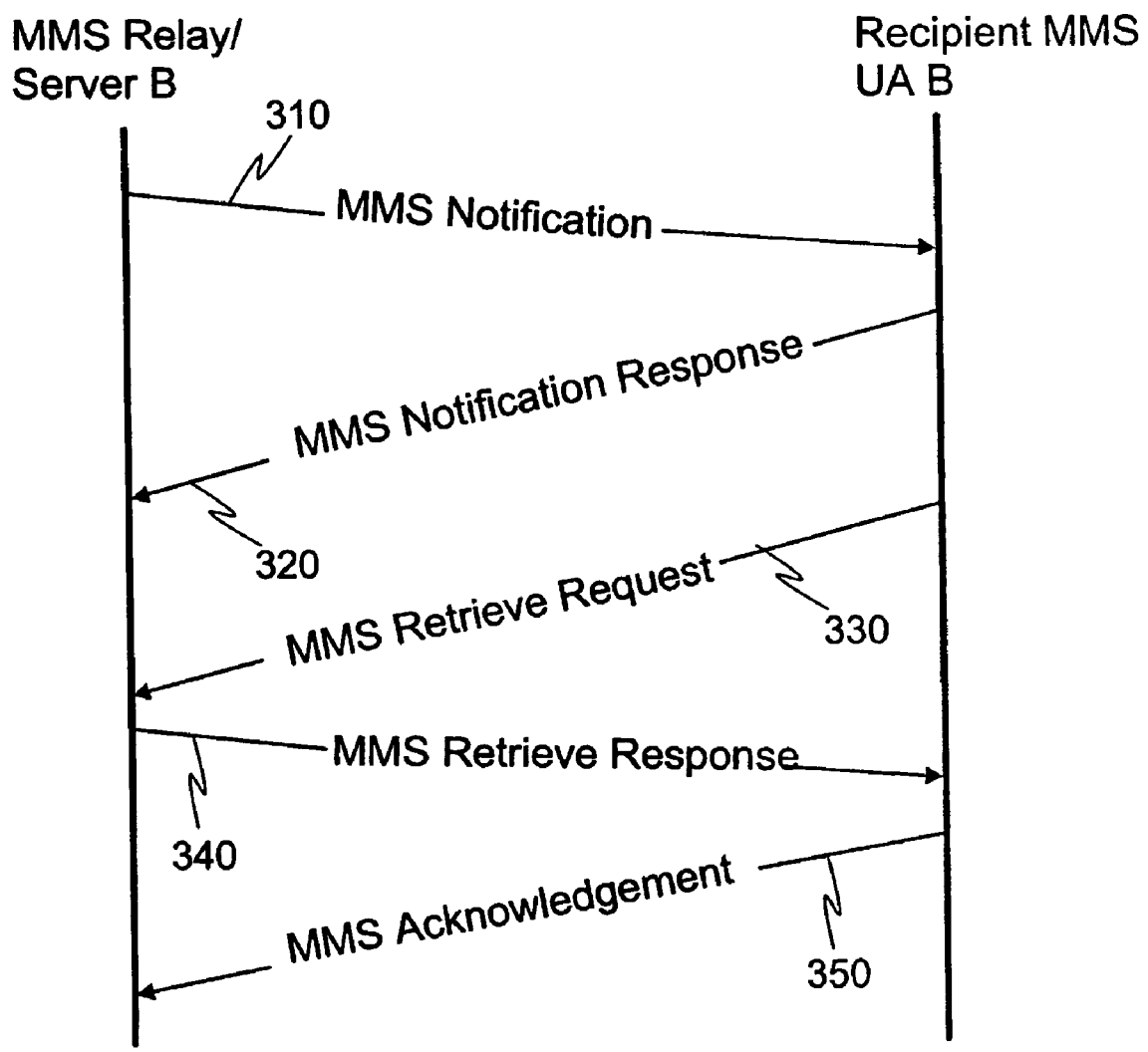
FIG. 3 shows the flow of messages between a receiving MMS relay/MMS server and a recipient MMS user agent.

FIGS. 1 to 3 have been described in the foregoing to illustrate the prior art. They also form a framework within which the present invention can be implemented.

A preferred embodiment of the invention will next be described with reference to the operation of an MMS system on receiving a multimedia message containing streamable- and non-streamable media components. An example implementation of an MMS system that supports the preferred embodiment is also described.

The preferred embodiment of the present invention is based on replacing a streamable media component of a multimedia message with a descriptor that provides information allowing a recipient MMS user agent to initiate a streaming session to download the streamable media component. As previously described, until now, streaming in connection with MMS has only been possible by altering the MMS notification message 310. In the preferred embodiment of the present invention, the descriptor is embedded in the multimedia message and is received by a recipient user agent just as any other media component in the MMS retrieve response. The user agent extracts the information provided by the descriptor, which can then be used to initiate a streaming session to download the streamable media component. In the preferred embodiment of the invention, the descriptor itself contains information needed to initiate a streaming session, so-called Session Description Data (SDD). In an alternative embodiment, however, the descriptor does not itself provide SDD, but contains a pointer to that information, for example a URI or URL to a location where SDD can be obtained. In either case, the provision of the descriptor in place of the streamable media component allows streaming in connection with MMS without having to modify the MMS notification message 310.

Figure 4:
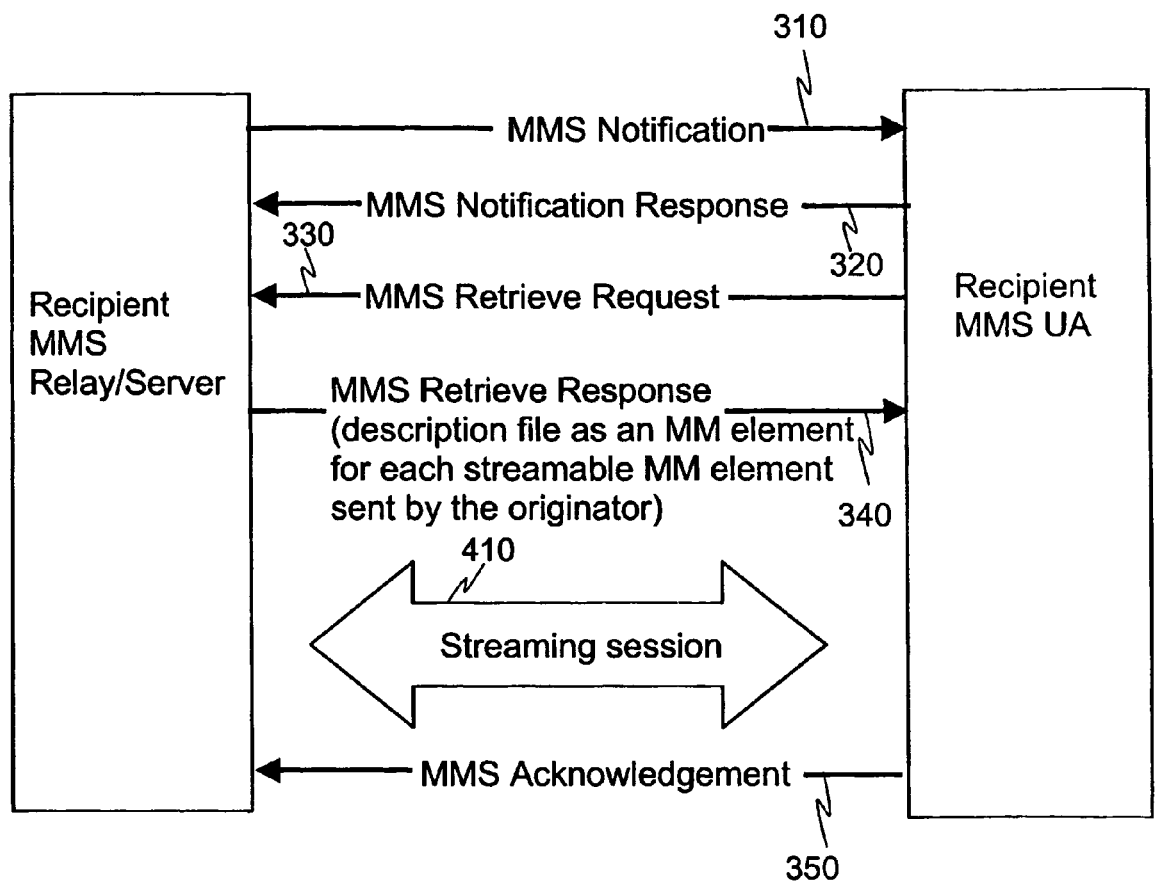
FIG. 4 shows the flow of messages between a receiving MMS relay/MMS server and a recipient MMS user agent, according to a preferred embodiment of the present invention.

FIG. 4 shows the flow of messages that takes place between a recipient MMSC and a recipient MMS user agent, according to the preferred embodiment of the present invention. After arrival of a multimedia message at the MMSC, messages 310 to 330 are first exchanged. This happens in a manner equivalent to what takes place in a conventional MMS system when there are no streamable media components in a received multimedia message. The modifications introduced by the present invention affect the signalling that takes place after the MMS retrieve request 330. According to the preferred embodiment, if the received multimedia message comprises a streamable media component in addition to a non-streamable media component, the MMS retrieve response 340 contains the non-streamable multimedia message component and a descriptor describing the streamable media component. According to the preferred embodiment, in a situation where the multimedia message contains more than one streamable media component, each streamable media component is replaced with a separate descriptor, each descriptor comprising SDD sufficient to allow recipient user agent 110B to initiate a streaming session for receiving the streamable media component in question. In the alternative embodiment, in which the descriptor contains a pointer to the SDD, the recipient user agent 110B retrieves the SDD from a network entity such as an MMS content server indicated by the pointer. If the multimedia message contains only streamable media components, then the multimedia message will only contain descriptors of streamable media components.

In the preferred embodiment of the invention, the descriptors are typically arranged in form of a session description file, such as a Session Description Protocol (SDP) document, which is included within the MMS message. The actual file structure can be implemented in various manners, but according to the preferred embodiment, a structure such as that shown in Wireless Application Protocol WAP Multimedia Messaging Service Version 1.0, Message Encapsulation Draft 0.8 (17 Feb. 2000), FIG. 2 is used. It is advantageous to arrange the multimedia message such that the descriptor is delivered in the early part of the MMS message so that the streaming session(s) can be initiated without large delays, after downloading of the MMS message has commenced.

Alternatively, a shared session description file may contain descriptions of two or more downloadable multimedia components. However, the use of separate session description files provides the advantage of more flexible use, since different network entities may replace different streamable media components with respective descriptors.

The session description file provides a description of the presentation for a particular streamable media component and allows the recipient to accomplish the media initialisation part of the streaming process. An SDP file is a good example of a widely used session description file type. SDP has an Internet Assigned Numbers Authority (IANA) registered Multi-purpose Internet Mail Extensions (MIME) type which, according to the preferred embodiment of the invention, can be mentioned as the content type of the component of the MMS Retrieval Response message 340.

Advantageously, the session description file contains the following data: a protocol version, information about the owner and/or creator of the media content, a session identifier, a session name and attributes, session information, an originator identifier, such as the e-mail address or phone number of the sender of the message, connection information, bandwidth information, different time-related information, and a title and attribute for each media component described by the session description file. The session description file may further comprise some cryptographic information, such as a Message Authentication Code (MAC), a cryptographic checksum for checking the validity of the content, or a challenge for allowing the recipient MMS user agent to generate a session key to be used for decrypting or validating the content.

In alternative embodiments, other forms of files are used for this purpose. TEXT, RTSL and MHEG are some other example files to be used for this purpose and all these files have a registered MIME type.

In the alternative embodiment using pointers, the descriptor typically contains a URI or URL corresponding to the location of session description data (SDD) needed for initiating a streaming session to retrieve the streamable media component. In this case, the SDD is typically in the form of a session description file, as described in connection with the preferred embodiment. A single descriptor may also contain pointers to the SDD for two or more streamable media components.

The streaming session is implemented according to commonly used streaming protocols. The Real Time Streaming Protocol (RTSP) is a well-known session layer protocol in this regard. The Real Time Protocol/Real Time Control Protocol (RTP/RTCP) are designed to control the transport of streaming content, while the user datagram protocol (UDP) and/or transmission control protocol (TCP) can be used as transport protocol for streaming.

The multimedia message, that is, the content, can be uploaded to the MMSC either by streaming or by any other appropriate method. In the preferred embodiment of the present invention, use of streaming in downloading media content to a given recipient is independent of the manner in which the content was uploaded to MMS relay B.

Figure 5:
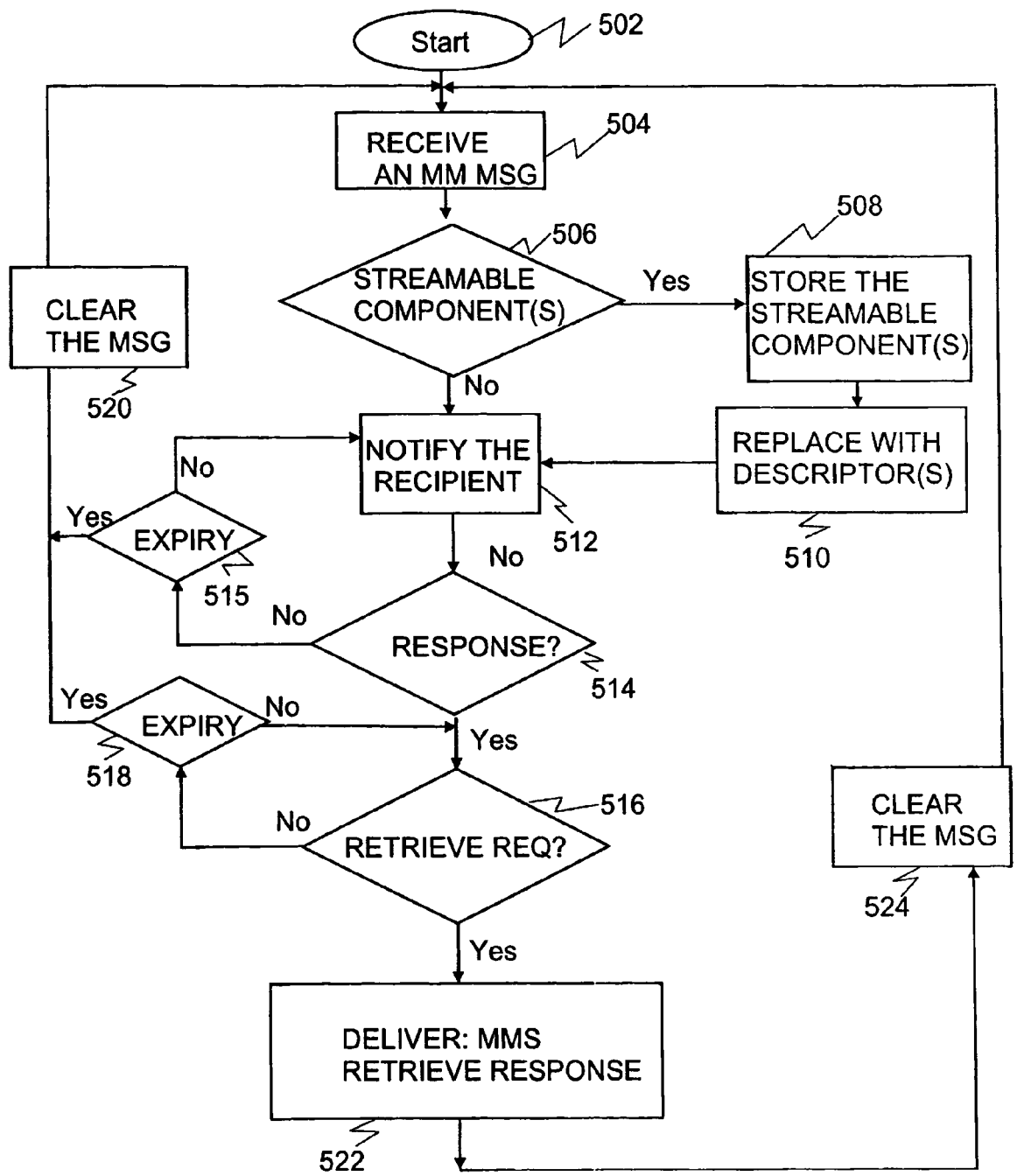
FIG. 5 shows a flow chart describing the operation of an MMS relay/MMS server, according to the preferred embodiment of the present invention.

FIG. 5 shows a flow chart describing the operation of a recipient MMS relay/server 224 according to the preferred embodiment of the present invention. The operation starts from block 502. Next, MMS relay B receives a multimedia message (block 504). The MMS relay checks whether the multimedia message contains any streamable media components (block 506). If the message contains one or more streamable media components, each streamable media component is stored (block 508) and a descriptor appropriate for the component in question is formed and included in the multimedia message in place of the streamable media component itself (block 510). In the next step of the operation, the recipient MMS user agent is notified (MMS notification) that the multimedia message is available (block 512).

After receiving notification of an available multimedia message, the recipient MMS user agent should acknowledge the notification by sending an MMS notification response message. The MMS relay checks if the relay has received the MMS notification response (block 514). If not, the MMS relay checks whether the message has expired (block 515). If the message has not expired, the relay attempts to notify the recipient again, for example, after a predetermined time period has elapsed. If the message has expired, the MMS relay will not attempt to notify the recipient user agent again and advantageously clears the message (block 520), that is, erases the stored media components related thereto.

If a notification response is received (block 514), the operation proceeds by checking for the receipt of an MMS retrieve request (block 516). In the preferred embodiment of the invention, the MMS retrieve request can be integrated with the notification response, if both of these would otherwise be transmitted within a short period of time (for example, 1, 5 or 10 minutes), or if automatic downloading of incoming multimedia messages has been selected.

If the retrieve request has not been received, the MMS relay checks whether the multimedia message has expired (block 518). If it has, the operation proceeds to block 520 and the multimedia message is cleared as explained above. If the multimedia message has not expired, the operation proceeds to block 522. There the multimedia message, now containing a descriptor for each streamable media component, is transmitted to the recipient MMS user agent. After transmission of the multimedia message, the message is cleared (block 524) if the message is not needed for transmission to another recipient (e.g. in the case of multicasting). Typically, the message is cleared only after an acknowledgement of receipt has been received from the recipient MMS user agent.

Typically, an MMS relay is implemented as a server computer and is controlled by a computer program, which enables the MMS relay to operate according to the aforementioned steps.

Figure 7:
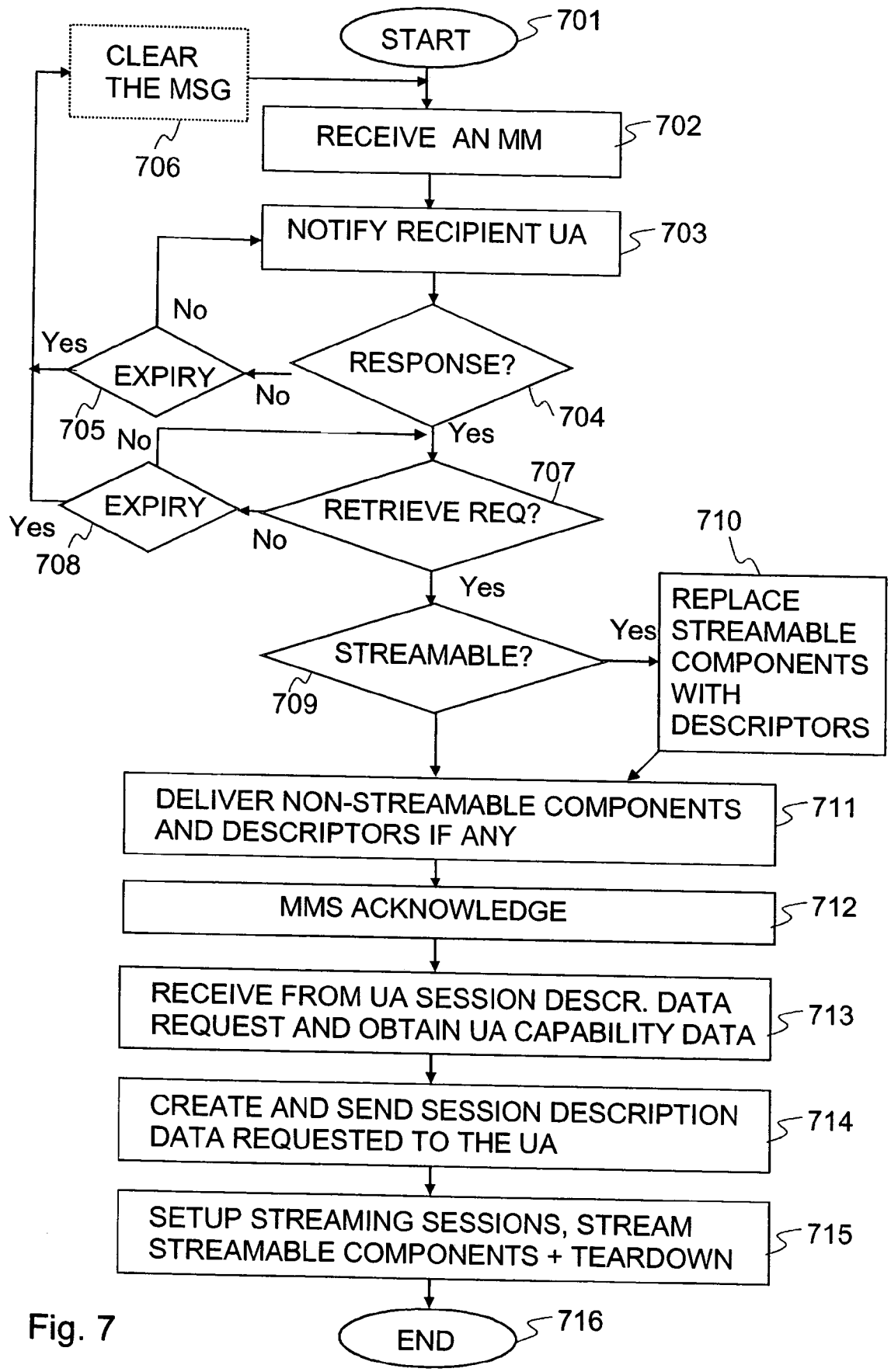
FIG. 7 shows a flow chart describing the operation of a recipient MMS relay/MMS server according to an alternative embodiment of the present invention in which pointers are used to obtain Session Description Data (SDD)

FIG. 7 shows a flow chart describing the operation of a recipient MMS relay/server B 224 according to the alternative embodiment of the present invention in which pointers are used to obtain the SDD. The operation starts from block 701. In block 702, MMS relay B 224 receives a multimedia message. In block 703, the MMS relay B 224 attempts to notify the recipient UA with an MMS notification 310 that the multimedia message is now available to MMS recipient UA 110B. MMS relay B 224 then checks, in block 704, if an MMS notification response 320 has been received acknowledging the receipt of the MMS notification 310. If an MMS notification response 320 has been received, the operation proceeds to block 707, otherwise it is checked in block 705 if the multimedia message has expired. If yes, the operation returns to the block 702 via an optional block 706 where the multimedia message is cleared. Instead of clearing the multimedia message at block 706, MMS relay B 224 may erase the multimedia message at a later stage, for example when more storage capacity is needed or when the multimedia message reaches a predetermined age. If the multimedia message has not expired, MMS relay B 224 repeatedly attempts to notify recipient UA 110B in block 703 until the multimedia message expires. Typically, the expiry is a condition of time and/or number of attempts to notify recipient user agent UA 110B. MMS relay B 224 may send, for instance, MMS notification 310 up to ten times with an interval of 1 to 60 minutes so that a recipient UA 110B is likely to receive MMS notification 310.

As described in connection with the preferred embodiment of the invention, the MMS retrieve request can be integrated with the notification response, if both of these would otherwise be transmitted within a short period of time (for example, 1, 5 or 10 minutes), or if automatic downloading of incoming multimedia messages has been selected.

Blocks 704 and 705 may further check if the multimedia message has been cancelled by the originator of the multimedia message or by an MMS operator acting as a moderator. If the multimedia message has been cancelled, the operation returns to block 702 via block 706 and the multimedia message is cleared.

After successfully notifying recipient MMS UA 110B about the multimedia message, MMS relay B 224 starts polling (blocks 707 and 708) the reception of an MMS retrieve request message 330 until the expiry of conditions relating to delivery of the multimedia message. These conditions typically include an expiry time and/or date after which the multimedia message will no longer be maintained. If the expiry conditions are fulfilled the operation jumps from block 708 to block 706 and the multimedia message is cleared.

In block 709, MMS relay B 224 next checks if the multimedia message contains any components that can be made available to recipient MMS UA 110B by streaming. If yes, the procedure continues to block 710 where those media components that can be made available by streaming are replaced with descriptors.

In block 710 the streamable components are also stored in an MMS server (MMS server B) associated with MMS relay B 224. MMS server B 224 may be integrated with the MMS relay B or may be a different physical entity, in which case MMS relay B 224 sends the streamable components to the separate MMS server for storage.

The determination of streamability in block 709 may depend on various criteria, such as the capabilities of MMS relay B 224, the capabilities of recipient MMS UA 110B which are available in MMS retrieve request 330 and the content type (audio, video etc.). MMS relay B 224 may also have a pre-defined list of content types which are streamable for use in determination of streamability. Optionally, recipient MMS UA 110B can indicate the content types it is able to stream in MMS retrieve request signal 330.

Alternatively, the operations of block 709 and 710 may be performed by MMS server 224 rather than MMS relay B 224. Then, MMS relay B 224 need not be informed of the capabilities of MMS server 224. It is still straightforward to construct a system with numerous MMS servers connected to a common MMS relay so that all the capabilities of the MMS servers can be used provided that the recipient MMS UA supports these capabilities. When a new MMS server is added, or the capabilities of an MMS server are enhanced, the system automatically starts making use of them. Otherwise, a communication arrangement is needed to keep MMS relay B 224 informed of the capabilities of MMS media server 224.

It should be appreciated that since the question of streamability is not examined by MMS relay B 224 before receiving MMS retrieve request 330, the recipient user who receives the notification may freely choose to use any UE as recipient MMS UA 110B for retrieving the multimedia message. In this way, the capabilities of the UE actually used can be taken into account both in the determination of whether some of the multimedia message content may be provided by streaming and in generation of the SDD such that, for example, the frame rate, pixel resolution, and codec are suitable for recipient MMS UA 110B. If the UE is changed from a device with very limited software and hardware resources to another with ample of resources, for example, MMS relay B 224 can adapt to the change in such a way as to select components for streaming with reference to the true capabilities of the UE.

In block 711, on or after storage of the streamable media components, MMS server B 224 delivers any non-streamable media components and descriptors representing streamable media components.

MMS relay B 224 then receives an MMS acknowledge signal 350. Before or after acknowledge signal 350, the procedure continues to block 713, where MMS server B 224 receives an RTSP DESCRIBE signal, requesting the SDD. Recipient MMS UA 110B makes a capability association for MMS server B 224 between capabilities of recipient MMS UA 110B and the multimedia message in question, by providing its identification and/or capability data for respective indirect and/or direct UA capability provision and linkage with the multimedia message. Having the capability association, MMS server B 224 can generate the SDD taking into account the UA capabilities.

In block 714, MMS server B 224 next generates the SDD and sends it to the UA that requested delivery of the multimedia message, typically in the form of an SDP file, naturally provided that the UA has rights to receive the multimedia message.

After providing the SDD to recipient MMS UA 110B, MMS server B 224 sets up a streaming session, starts streaming the data, and tears down the streaming session (block 715), as many times as necessary according to the number of streamable media components. These streaming processes can be performed at least partly in parallel or simultaneously so that recipient MMS UA 110B can present two or more streams simultaneously. After all the streamable media components and non-streamable media components are delivered, the procedure of delivering a multimedia message ends in block 716.

Typically, an MMS relay and an MMS server are implemented as a server computer controlled by a computer program, which enables the MMS relay and MMS server to operate according to the aforementioned steps. Typical to such server computers, the MMS relay and MMS server are able to multitask for continuously monitoring incoming messages and processing them so that the MMS relay and MMS server can serve numerous recipient MMS user agents simultaneously. It should also be appreciated that the MMS relay and MMS server may have two or more parallel processes illustrated in FIG. 7 pending for a single MMS user agent in such a way that two or more multimedia message are processed substantially independent of each other, particularly with regard to the reception and notification steps 702 to 708.

Figure 8:
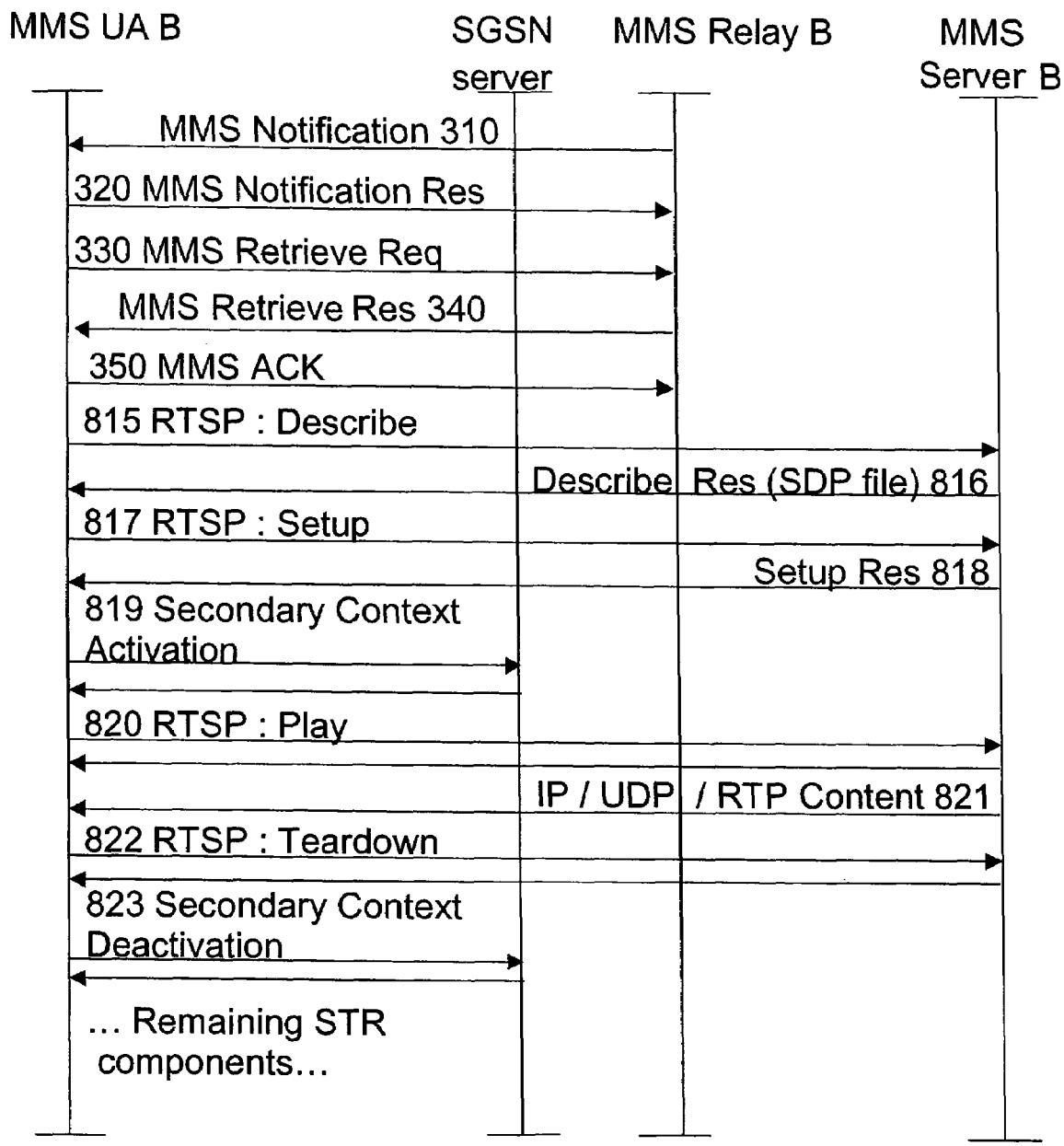
FIG. 8 shows the flow of signalling related to receiving a multimedia message, according to the embodiment of FIG. 7.

The signalling related to delivery of the multimedia message to MMS user agent B according to the alternative embodiment of the present invention will now be described with reference to FIG. 8. When the multimedia message addressed to MMS user agent B arrives at MMS relay B, it stores the media content of the message in MMS server B and sends an MMS notification signal 310 to recipient MMS user agent B. Responsive to receipt of the notification signal, MMS user agent B replies with an MMS notification response signal 320. Later, or optionally as part of signal 320, MMS user agent B sends an MMS retrieve request signal 330 to MMS relay B. MMS relay B responds by sending a multimedia message comprising non-streamable media components and descriptors representing any streamable media components in an MMS retrieve response 340. Responsive to receiving MMS retrieve response 340, MMS user agent B sends an MMS acknowledgement signal 350 to MMS relay B. According to the alternative embodiment of the invention, the descriptors used to represent streamable media components do not themselves provide Session Description Data (SDD) to be used by MMS user agent B in establishing a streaming session. Instead, they take the form of pointers, for example URI's or URL's to locations where SDD can be obtained.

Using the descriptors, MMS user agent B can invoke a streaming process to download the streamable media components one by one. The streaming process to download a particular media component is initiated, controlled and terminated by exchanging signals 815 to 823, as illustrated in FIG. 8. The signals 815, 816, 817, 818, 820, 821 and 822 are implemented using the Real-Time Streaming Protocol (RTSP). Alternatively, the Hypertext Transport Protocol (HTTP) is used instead of RTSP to provide these signals. Two or more streaming processes can take place at the same time so that the recipient MMS user agent can play or present two or more streamable media components simultaneously. In this case signals 815 to 823 are exchanged for each streamable media component. Typically, the playing of the streamable media components is synchronised by means of commonly used protocols such as Synchronised Multimedia Integration Language (SMIL) definitions provided together with the SDD.

To enable the streaming process for a certain streamable media component represented by a particular descriptor, MMS user agent B requests SDD relating to the media component from MMS server B. In FIG. 8, this request is represented by signal 815 and it can be made, for instance, using a Real-Time Streaming Protocol (RTSP) DESCRIBE method that identifies the streamable media component in question.

In response to the RTSP DESCRIBE method signalling, MMS server B provides a response signal 816 containing the SDD.

Signal 815 may also be used to inform MMS server B about capabilities of MMS user agent B. This forms an association between the streamable media component requested in signal 815 and the recipient MMS user agent requesting the media component. It further allows the multimedia messaging system to create the SDD required by MMS user agent B to form a streaming session with MMS server B at the time a streaming session is actually being initiated. As a result, the SDD is only created when needed. It also follows that if a particular streamable media component is not retrieved for some reason, no SDD is created for that component. Furthermore, since the SDD is created only at a stage substantially immediately prior to or during establishment of a streaming session to download the media component, MMS server B can create the SDD so that it is tailored specifically for the recipient MMS user agent. This means that the user can stream a particular streamable media component to an MMS user agent other than that which received the MMS notification and/or MMS retrieve response 340. Although the user may have changed the recipient MMS user agent, an appropriate streaming session may still be established and the streamable media component will be received in a format suitable for the equipment used.

Advantageously, the capability information provided to MMS server B is obtained from a user equipment capability database 160 that contains information about the technical capabilities of different MMS user agents and/or user preferences concerning different MMS subscribers. In this case, signal 815 is typically formed in accordance with 3GPP Technical Specification 26.234 Version 5.1.0 section A.4. Accordingly, MMS user agent B includes one or several Uniform Resource Locators (URLs) in signal 815. These URLs point to locations in one or several user databases 160 from where MMS server B can retrieve capability profiles or streaming adaptation information, that is, information describing device capabilities and/or user preferences. This list of URLs is encapsulated in RTSP protocol data units using additional header field(s) and transmitted from MMS user agent B to MMS server in the RTSP DESCRIBE method signalling.

Alternatively, signal 815 may contain all the necessary capability and/or user preference information for MMS server B so that MMS server B can autonomously generate the SDD suitable for the recipient MMS user agent.

Advantageously, the capability information relating to a recipient MMS user agent includes at least information about the streaming-specific capabilities of the MMS user agent. Alternatively, the capability information may be more comprehensive including, for example, information relating to the display or audio reproduction capabilities of the MMS user agent.

In response to signal 815, MMS server B forms SDD taking into account the capabilities of the recipient MMS user agent, as described above, and replies by sending the SDD to MMS user agent B, in signal 816, for example in the form of a Session Description Protocol (SDP) file. Using the SDP file, MMS user agent B then sends an RTSP SETUP signal 817 to MMS server B in order to initialise a streaming session. MMS server B responds by sending an RTSP SETUP response signal 818 to MMS user agent B.

After having successfully initialised a streaming session with MMS server B using the RSTP SETUP method, MMS user agent B starts streaming the media component from MMS server B. In the present example, in which the MMS system is implemented in a third generation mobile communication network, it is first necessary to activate a secondary Packet Data Protocol (PDP) context. Activation of the secondary PDP context enables the transport of data packets containing the media content from MMS server B to MMS user agent B. In order to set up the secondary PDP context MMS user agent B signals 819 with a Serving General packet radio service Support Node (SGSN) of the mobile communications network. Activation of the secondary PDP context and its use in delivery of the media component using packet based communication is conducted in a manner known from third generation/GPRS specifications. In embodiments of the invention implemented in mobile communication systems based on different communication technologies and/or protocols, alternative to GRPS, other packet or circuit switched data services can be employed.

Following activation of the secondary PDP context, MMS user agent B starts streaming the media component by sending RTSP PLAY signalling 820 to MMS server B. The streamable media component is then streamed 821 from MMS server B to MMS user agent B using the Internet Protocol (IP)/User Datagram Protocol (UDP)/Real-time Transport Protocol (RTP).

After streaming of the media component has been completed, MMS user agent B terminates the streaming session by performing RTSP TEARDOWN method signalling 822 with MMS server B. MMS user agent B next deactivates the secondary PDP context, as it is no longer needed to transfer the media component. Deactivation of the secondary PDP context is affected by signalling 823 with the SGSN (see FIG. 8).

As elaborated in the description of the preferred embodiment, SDD is provided to the recipient MMS user agent before it can start down-streaming a streamable media component. However, in the alternative embodiment of the invention, the SDD is not embedded in the multimedia message instead of a streamable media component. The alternative embodiment of the invention allows providing only a brief streaming indication that is a descriptor for each streamable media component. The descriptor contains information that enables the recipient to obtain the SDD it requires to initiate a streaming session with the server where the streamable content is stored. As described above, the descriptor takes the form of a pointer (such as a Uniform Resource Locator, URL) to a location where the SDD may be obtained. Advantageously, the provision of the descriptor and its inclusion in the multimedia message requires the recipient MMS relay to perform only a few operations. The descriptor typically specifies an access type to use, such as RTSP or HTTP, an address of the server and the identification of the content. More specifically, if the descriptor is a pointer such as a URL, it may have a format such as "rtsp://mediaserver.com/news/video24112002_123456", where "rtsp:" defines the access type, "mediaserver.com" specifies the address of the server and "/news/video" identifies the content.

It is advantageous to arrange the multimedia message such that the descriptor(s) representative of streamable media components are delivered in the early part of the multimedia message so that the streaming session(s) can be initiated as soon as possible, after downloading of a multimedia message has commenced.

Furthermore, the SDD is only generated on or after sending of the MMS retrieve request 330 by the recipient MMS user agent, according to the streaming-specific capabilities of the particular User Equipment (UE) that is used as a streaming terminal.

The retrieval of the SDD may employ mechanisms described in connection with the preferred embodiment. Also any of the form of the SDD, its contents, uploading of the multimedia message, and setting up of the streaming session after the recipient user agent has received the SDD may comply with the description of the preferred embodiment.

As described above, the SDD is arranged in form of a session description file, such as a Session Description Protocol (SDP) file, which is a widely used session description file type. The session description file provides a description of the presentation for a particular streamable media component or components and allows the recipient MMS user agent to accomplish media initialisation for the streaming process. SDP has a registered Internet Assigned Numbers Authority (IANA) Multi-purpose Internet Mail Extensions (MIME) type.

Advantageously, the session description file contains the following data: a protocol version, information about the owner and/or creator of the media content in a streamable media component, a session identifier, a session name and attributes, session information, an originator identifier, such as the e-mail address or phone number of the sender of the multimedia message, connection information, bandwidth information, different time-related information, and a title and attribute for each media component described by the session description file. The session description file may further comprise some cryptographic information, such as a Message Authentication Code (MAC), a cryptographic checksum for checking the validity of the content, or a challenge for allowing the recipient MMS user agent to generate a session key to be used for decrypting or validating the content.

Other forms of files than SDP can alternatively be used for this purpose. TEXT files and files compliant with the Multimedia and Hypermedia Information Coding Experts Group (MHEG) ISO/IEC standard 13522 may also be used for this purpose. All these file types have a registered MIME type.

Generation of SDD dependent on the capabilities of the UE actually used to down-stream a streamable media component provides the MMS system with a great degree of flexibility, since MMS server B can adapt to the UE used each time a streamable media component is to be down-streamed.

Typically, the recipient MMS UA 110B sets up the streaming sessions immediately after receiving the SDD. Alternatively, the recipient MMS UA 110B can store the SDD in its memory for use at some later time to initiate a streaming session so that there will be a substantial delay between reception of the SDD and starting the down-streaming. In case of two or more streamable media components, typically the signalling resulting in RTSP SETUP is completed for each streamable media components and before performing the RTSP PLAY method for any streamable media component so that the play-out of these streamable media components starts in a synchronised manner.

The entire multimedia message can be uploaded to the recipient MMSC 224 either by streaming or by any other appropriate method. In the alternative embodiment of the present invention, use of streaming in downloading media content to a given recipient MMS user agent is independent of the manner in which the content was uploaded to the MMS relay B 224.

Whilst typically the same MMS server, or server, may store all the components of a multimedia message, some of the multimedia message components may be distributed on different servers. For example, a streamable media component may be stored on a particular content provider's own MMS server and in this case the pointer to such a component would refer to a different server than that storing other streamable or non-streamable media components.

Figure 6:
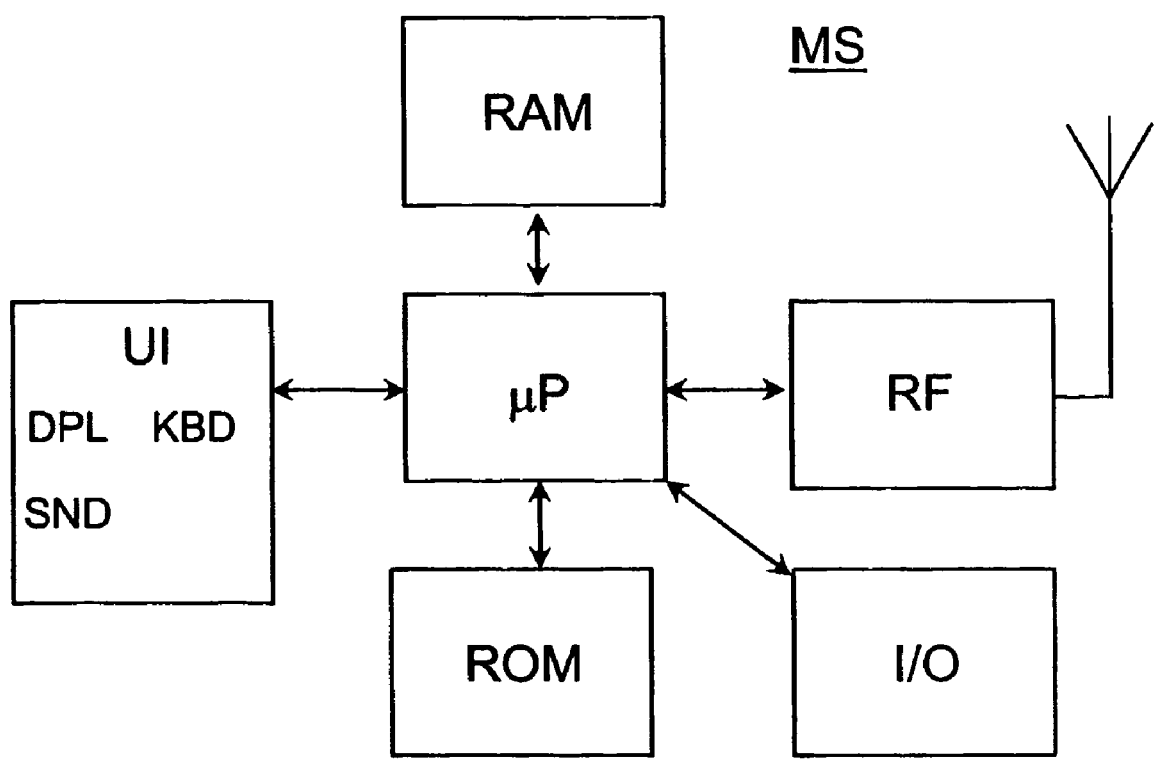
FIG. 6 shows a block diagram of the structure of an MMS user agent, according to the preferred embodiment of the present invention.

FIG. 6 shows the structure of an MMS user agent according to the preferred embodiment of the present invention in which the MMS user agent is implemented in a wireless communication device. The MMS user agent of FIG. 6 is also suitable for use with the alternative embodiment of the invention where a pointer is used to retrieve the SDD. A microprocessor μP controls the blocks responsible for the MMS user agent's different functional blocks. These functional blocks comprise a random access memory RAM, a radio frequency block RF, a read only memory ROM, an input/output port I/O for external connections, a user interface UI, having an audio system SND and a display DPL for presenting multimedia messages and a keyboard KBD for receiving data and commands from a user. The microprocessor's operating instructions, that is program code and the MMS user agent's basic functions are stored in advance, for example during the manufacturing process, in the ROM. In accordance with its program, the microprocessor uses the RF block for transmitting and receiving messages on a radio path. The microprocessor monitors the state of the user interface UI and controls the MMS user agent according to the program code. On receiving a multimedia message, the microprocessor μP examines the message for a descriptor of a streamable media component. If it finds a descriptor, it initiates a streaming session accordingly for retrieving, or down streaming, a corresponding media component. If more than one descriptor is found, a corresponding number of streaming sessions are initiated for down streaming the respective media components. In the alternative embodiment, the MMS user agent will retrieve the SDD according to the pointer contained by the descriptor.

Typically, the streaming sessions are set up substantially immediately, but alternatively, the descriptor information can also be stored in the random access memory RAM and used at some later time to initiate a streaming session.

If a particular media component is of a type not supported by the MMS user agent itself, the microprocessor may control the input/output port I/O to forward such a component to an external device that supports that type of media component. Such an external device may be a personal computer, typically a laptop computer. This also provides the advantage of allowing use of enhanced user interface and sound capabilities, if the external device provides such facilities. The input/output port may be an infrared port, a wired port, or a Low Power Radio Frequency connection port such as a Bluetooth port.

In case of a streamable media component, the descriptor information can be passed to such an external device to enable that external device to establish a streaming session, either via the MMS user agent or via another route, such as fixed Internet access.

Advantageously, the MMS relay has access to a user profile of the recipient user agent stored in the user databases 160. Using the profile, the relay can determine whether each of the media components of a multimedia message conforms to the capabilities of the recipient user agent and/or preferences defined the recipient user agent's user profile. If necessary, media components of excessive quality may be down-converted to a lower, but sufficient quality level, such that their transmission is faster and they can be readily used by the recipient user agent without any further conversion or manipulation before presentation to the user. Similarly, media components may be converted from one media format to another, such that the result conforms to the capabilities and/or preferences of the recipient user agent. The conversion may be made either beforehand or on/during transmission of the MMS retrieve response.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

The invention claimed is:

1. A method in a mobile multimedia messaging user agent, comprising:
   receiving a notification message that a multimedia message is available;
   after receiving the notification message, sending a retrieve request for obtaining the multimedia message;
   retrieving a multimedia message transmission responsive to the receiving of the notification message;
   separating from the multimedia message transmission a descriptor, the descriptor representing a stored streamable media component and containing information necessary to initiate a streaming session, the information necessary to initiate the streaming session comprising a pointer to session description data;
   obtaining the session description data using the pointer; and
   initiating a streaming session, using the session description data, to retrieve by streaming the stored streamable media component described by the descriptor.

2. A method according to claim 1, further comprising transmitting streaming adaptation information before receiving the session description data.

3. A method according to claim 1, wherein the streaming adaptation information is transmitted after receiving the notification message.

4. A method according to claim 1, wherein the descriptor is selected from a group consisting of a session description file, a uniform resource locator (URL), and a Universal Resource Identifier (URI).

5. A method according to claim 1, wherein two different streamable media components of a multimedia message are represented by two different descriptors contained in the multimedia message.

6. A method according to claim 1, wherein the multimedia message transmission is received wirelessly.

7. A method in a mobile multimedia messaging service network entity, comprising:
   receiving a multimedia message containing a streamable media component and a non-streamable media component;
   replacing the streamable media component with a descriptor providing information allowing a recipient user agent to initiate a streaming session to retrieve the streamable media component;
   sending to the recipient user agent a notification message that the multimedia message is available;
   receiving a multimedia message retrieve request for the multimedia message from the recipient user agent; and
   responsively to the request for the multimedia message, sending the multimedia message without the streamable component to the recipient user agent;
   wherein
   the information allowing the multimedia user agent to initiate a streaming session comprises a pointer using which session description data necessary to initiate a streaming session can be obtained.

8. A method according to claim 7, further comprising:
   obtaining streaming adaptation information regarding the user agent; and generating the session description data in accordance with the streaming adaptation information.

9. A method according to claim 8, wherein the streaming adaptation information is obtained after the sending of the notification message.

10. A method according to claim 9, wherein the obtaining of the streaming adaptation information is responsive to the multimedia message retrieve request.

11. A method according to claim 10, wherein the sending of the session description data is responsive to the multimedia message retrieve request.

12. A method according to claim 7, wherein if the multimedia message contains more than one streamable media component, each streamable media component is represented with a corresponding descriptor.

13. A method according to claim 7, wherein if the multimedia message contains more than one streamable media component, at least two streamable media components are replaced with one descriptor common for all replaced components.

14. A method according to claim 7, wherein the descriptor is provided by an entity selected from a group consisting of a recipient MMS relay and a recipient MMS server.

15. A method according to claim 7, wherein the session description data is contained in a session description protocol (SDP) file.

16. A method according to claim 7, wherein sending of the multimedia message to the recipient user agent causes the multimedia message to be transmitted over a wireless data transmission channel.

17. A multimedia messaging user agent comprising:
a transceiver configured to receive a notification message that a multimedia message is available, to transmit a retrieve request for the multimedia message and to receive the multimedia message; and
a processor configured to separate a non-streamable media component from the multimedia message and configured to obtain from the multimedia message a descriptor that represents a stored streamable media component and contains information necessary to initiate a streaming session, the information necessary to initiate the streaming session comprising a pointer to session description data;
the processor being further configured to control the transceiver to obtain session description data by using the pointer and to control the transceiver to initiate the streaming session using the session description data in order to retrieve the stored streamable media component described by the descriptor.

18. A user agent according to claim 17, wherein the transceiver is further configured to transmit streaming adaptation information before receiving the session description data.

19. A user agent according to claim 18, wherein the transceiver is further configured to transmit the streaming adaptation information after receiving the notification message.

20. A user agent according to claim 19, wherein the descriptor is selected from a group consisting of a session description file, a uniform resource locator (URL), and a Universal Resource Identifier (URI).

21. A user agent according to claim 19, wherein two different streamable media components of a multimedia message are represented by two different descriptors contained in the multimedia message.

22. A user agent according to claim 19, wherein the transceiver is a wireless transceiver.

23. A multimedia messaging service system comprising:
a first network element configured to receive a multimedia message comprising a streamable media component;
a plurality of user agents;
a second network element configured to notify a recipient user agent of a multimedia message available to the recipient user agent;
a third network element configured to replace the streamable media component with a descriptor allowing the recipient user agent to initiate a streaming session to retrieve the streamable media component; and
the second network element configured to receive a request for delivering the multimedia message to the recipient user agent and to transfer the multimedia message to the recipient user agent responsive to the request, the multimedia message including a non-streamable media component, wherein
the descriptor comprises a pointer using which the recipient user agent can obtain session description data necessary to initiate a streaming session configured to deliver the streamable media component.

24. A system according to claim 23, wherein the second network element and the third network element belong to a common network entity.

25. A multimedia messaging network entity configured to operate in a mobile multimedia messaging service, comprising:
a first input configured to receive a multimedia message containing a streamable media component;
a processor configured to replace the streamable media component of the multimedia message with a descriptor providing information allowing a recipient user agent to initiate a streaming session to retrieve the streamable media component, wherein the information allowing the multimedia user agent to initiate a streaming session comprises a pointer using which session description data necessary to initiate a streaming session can be obtained;
an output configured to send to the recipient user agent a notification that the multimedia message is available to the recipient user agent; and
a second input configured to receive a multimedia message retrieve request from the user agent;
wherein the output is further configured to send the multimedia message to the recipient user agent responsively to receiving the retrieve request, the multimedia message including a non-streamable media component and the pointer.

26. A network entity according to claim 25, wherein:
the processor is configured to obtain streaming adaptation information regarding the user agent and to generate the session description data in accordance with the streaming adaptation information.

27. A network entity according to claim 26, wherein the processor is configured to obtain the streaming adaptation information responsive to the multimedia message retrieve request.

28. A network entity according to claim 26, wherein if the multimedia message contains more than one streamable media component, each streamable media component is represented with a corresponding descriptor.

29. A network entity according to claim 26, wherein if the multimedia message contains more than one streamable media component, at least two streamable media components are replaced with one descriptor common for all replaced components.

30. A network entity according to claim 26, comprising at least one of a recipient MMS relay and a recipient MMS server.

31. A network entity according to claim 26, wherein the processor is configured to contain the session description data in a session description protocol (SDP) file.

32. A network entity according to claim 26, wherein the output is configured to send the multimedia message to the recipient user agent so that the multimedia message traverses over a wireless data transmission channel.

33. A computer program product stored in a computer readable storage medium for controlling a multimedia messaging user agent, comprising:
   computer program code enabling the user agent to receive a multimedia message transmission;
   computer program code enabling the user agent to separate a non-streamable media component from the multimedia message transmission;
   computer program code enabling the user agent to separate from the multimedia message transmission a descriptor representing a stored streamable media component and containing information necessary to initiate a streaming session, the information necessary to initiate the streaming session comprising a pointer;
   computer program code enabling the user agent to retrieve, using the descriptor, the stored streamable media component described by the descriptor; and
   computer program code enabling the user agent to obtain session description data using the pointer; wherein the computer program code enabling the user agent to initiate a streaming session being configured to use the session description data to initiate the streaming session.

34. A computer program product stored in a computer readable storage medium for controlling a multimedia messaging network entity, comprising:
   computer program code enabling the network entity to receive receiving a multimedia message containing a streamable media component;
   computer program code enabling the network entity to replace the streamable media component with a descriptor providing information allowing a recipient user agent to initiate a streaming session to retrieve the streamable media component, wherein the information allowing the multimedia user agent to initiate a streaming session comprises a pointer using which session description data necessary to initiate a streaming session can be obtained; and
   computer program code enabling the network entity to send to the recipient user agent a notification message that the multimedia message is available to the recipient user agent;
   computer program code enabling the network entity to receive a multimedia message retrieve request from the user agent;
   computer program code enabling the network entity to send the multimedia message to the recipient user agent responsively to receiving the retrieve request, the multimedia message including a non-streamable media component and the pointer.

* * * * *